(12) United States Patent
Sepich et al.

(10) Patent No.: US 8,429,229 B2
(45) Date of Patent: Apr. 23, 2013

(54) MULTIPURPOSE EGM/PLAYER TRACKING DEVICE AND SYSTEM

(75) Inventors: Edward Sepich, Henderson, NV (US); Norio Tone, Henderson, NV (US)

(73) Assignee: Konami Gaming, Inc., Las Vegas, NV (US)

( * ) Notice: Subject to any disclaimer, the term of this patent is extended or adjusted under 35 U.S.C. 154(b) by 747 days.

(21) Appl. No.: 12/235,237

(22) Filed: Sep. 22, 2008

(65) Prior Publication Data

US 2009/0082109 A1    Mar. 26, 2009

Related U.S. Application Data

(60) Provisional application No. 60/973,890, filed on Sep. 20, 2007.

(51) Int. Cl.
 *G06F 15/16* (2006.01)
(52) U.S. Cl.
 USPC ........... 709/205; 709/201; 709/202; 709/203; 709/208; 709/217; 709/218; 709/219; 709/227; 709/228; 709/230; 709/246; 709/249
(58) Field of Classification Search .......... 709/208–211, 709/230, 246, 201–203, 205, 217–219, 227–228, 709/249; 463/1, 42, 13, 20
 See application file for complete search history.

(56) References Cited

U.S. PATENT DOCUMENTS

| | | | |
|---|---|---|---|
| 6,442,588 B1* | 8/2002 | Clark et al. | 709/203 |
| 2001/0049303 A1* | 12/2001 | Found et al. | 463/42 |
| 2002/0165023 A1* | 11/2002 | Brosnan et al. | 463/29 |
| 2005/0113172 A1* | 5/2005 | Gong | 463/42 |
| 2007/0077995 A1* | 4/2007 | Oak et al. | 463/42 |
| 2007/0105628 A1* | 5/2007 | Arbogast et al. | 463/42 |
| 2008/0171592 A1* | 7/2008 | Doan | 463/25 |

* cited by examiner

*Primary Examiner* — Emmanuel L Moise
*Assistant Examiner* — Edward Kim
(74) *Attorney, Agent, or Firm* — Howard & Howard Attorneys PLLC

(57) ABSTRACT

A system and method provides gaming related and player/gaming attendant related services to a plurality EGM. Each EGM has an associated multipurpose EGM/player tracking device. Each multipurpose EMG/player tracking device has first and second ports. The first port couples the respective multipurpose EGM/player tracking device to the respective EGM using a communications link. The first port of one of the multipurpose EGM/player tracking devices may utilize a different communications protocol than another one of the advance player tracking device. A server computer is coupled the multipurpose EGM/player tracking devices using a system communications protocol through system communications links. The server computer provides gaming and player/gaming attendant services to users of the EGMs.

26 Claims, 9 Drawing Sheets

MULTIPURPOSE EGM/PLAYER TRACKING DEVICE AND SYSTEM

CROSS-REFERENCES TO RELATION APPLICATION

This application claims the benefit of U.S. Provisional Patent Application Ser. No. 60/973,890, filed Sep. 20, 2007, which is hereby incorporated by reference.

FIELD OF THE INVENTION

The present invention relates generally to electronic gaming machines (EGMs), and more particularly, to a multipurpose EGM/player tracking device and system.

BACKGROUND OF THE INVENTION

The growth and competition in the casino gaming market in recent years and the increasingly sophisticated and complex technology being integrated into the gaming environment, at the individual game, casino management, and auditing levels, presents both challenges and opportunities to game manufacturers, gaming establishment operators, and regulatory agencies. The technological capabilities and requirements of, for example, advanced electronic games, multi-site gaming operations, detailed player tracking, wide area progressive jackpots, and various alternatives to the use of currency and coins by players, all present a potentially huge pool of ever-changing data which can be of great value to casino operators (from a management standpoint) and to regulators from an audit/compliance standpoint.

In recent years, the popularity of video EGMs such as video and video poker EGMs has increased dramatically. Such EGMs are provided by a number of manufacturers. The growth of these types of EGMs has presented numerous opportunities to provide new and automatic services in the various areas, such as, EGM accounting, EGM monitoring, EGM progressives awards/jackpots, EGM ticketing, player tracking, player bonusing have been realized. Such services generally require information, e.g., meter information, taken directly from the electronic EGMs. This information is usually gathered and/or relayed to central/remote locations through specialized/add-on devices. These devices must communicate to the EGM using a communications protocol over a communications link which is typically dictated by the type and/or manufacturer of the EGM. It should also be noted that the communications link and/or architecture used for all EGMs at a particular site, e.g., is not necessarily the same.

One common communication protocol used to communication with electronic EGMs is the Slot Account System or (SAS) protocol. With particular reference to FIG. 3, a typical SAS implementation is shown. In this illustration, the EGMs 302, 304 are provided with corresponding slot machine interface board (SMIB) devices 306, 307 and player tracking devices 308, 309. The SMIB devices 306, 307 are physically connected to, and located within, the respective EGMs 302, 304. The player tracking devices 308, 309 are connected and communicate to the SMIBs 306,307 through either RS-232 or USB 312.

EGM accounting and monitoring data is exchanged to and from each EGM 302, 304 via the SAS protocol over respective communication links 310 to the SMIBs 306, 307 which is then communicated through RS-232 or Ethernet over respective communication links 318 to the Bank Controller 314 which communicates to the EGM Accounting & Monitoring server(s) 316.

Player tracking data is exchanged to and from the SMIBs 306, 307 then communicated over RS-232 or Ethernet over respective communications links 318 to the Bank Controller 314 which communicates to the player tracking server(s) 320.

Generally, these types of SMIBs are data pass-through or polled devices and contain little intelligence. In other words, the devices 306, 307 simply pass data back and forth between the EGMs 302, 304 and a bank controller 314 over respective second communication links 312, 318 using the SAS protocol. In most cases, the bank controller 314 contains the majority of the gaming logic and simply polls the SMIBs 306, 307 for data. The second communication links 318 may be implemented over an RS-232 or Ethernet. The bank controller 314 then relays the data back to the EGM Accounting and Monitoring server(s) 316. The player tracking devices 308, 309 interfaces with the SMIB and Player tracking server(s) 320 for player tracking related data and simply passes EGM specific data back and forth between the SMIBs 306, 307 through communication link 310 and player tracking specific data back and forth between the player tracking server(s) 320 by way of the bank controller 314.

Typically, a casino includes numerous EGMs arranged in banks. Each bank of machines has a corresponding bank controller 314 which is located remotely. One problem with this type of arrangement is that all of the EGMs 302, 304 which are connected to one bank controller 314 must use the same communications protocol. This, for example, all EGMs 302, 304 connected to the bank control 314 must utilize the SAS protocol.

The trend in gaming is to require more and more EGM and player tracking data to and from the EGMs 302, 304 and/or the SMIB devices 306, 307 and player tracking devices, 308 and 309. For example, one trend if the gaming industry is to move towards downloadable games, i.e., game software, including new games, updates, etc. . . . , which is downloaded from a central server to the EGMs. Another trend is to provide live and/or streaming video or other multimedia content either directly to the EGMs or the player tracking device.

Historically utilized communication protocols, e.g., SAS, X-Series, and QCOM were not designed to handle this type or volume of data such as downloading a new game to the EGM. The Gaming Standards Association has recently released a new standardized communications protocol, the Game-to-System or G2S standard, which was designed to provide a standard communications protocol which can handle the amount and type of data required by these new applications or services. The G2S operates over an Ethernet communications link using the TCP/IP protocol. However, the G2S protocol requires data to be transmitted in an XML format.

One potential hardware architecture to implement the G2S standard is shown in FIG. 4. This architecture shows that the SMIB device 307 from FIG. 3 are removed and the EGMs 304 communications is protocol 310 is replaced with Ethernet 311. Services provided using G2S are administered using G2S servers 322. The G2S server(s) 322 communicate to the player tracking server(s) 320 through the GSA System to System (S2S) protocol to each G2S player tracking device 308 through a data link over an Ethernet network 313. For player tracking services, a separate Ethernet links between the player tracking server(s) 320 and each G2S player tracking device 308. The G2S servers 322 and the player tracking server(s) 320 are also located at a remote location. Thus, separate Ethernet links must be provided to each G2S EGM 304 (and/or G2S player tracking devices 308). As each implementation, e.g., casino, can include thousands of EGMs, the amount of connections and network cabling using such architecture is immense and costly not to mention the complexity of network administration. Another problem is that most implementations, e.g., casinos, will for the foreseeable future be a hybrid of SAS and G2S EGMs and must accommodate both SAS protocol EGMs as illustrated in FIG. 4. There are significant complexities involved in support both SAS and G2S architectures simultaneously.

Another problem is that the G2S protocol, in using an XML format is not an efficient way to communicate large amounts of response sensitive data in real-time. One potential problem is that even high speed Ethernet networks may not be able to support the bandwidth required in providing such services using the G2S protocol to G2S EGMs 304.

Another problem is that in the systems shown in FIG. 3 (and systems using similar architectures), in order to move a EGM (or other EGM) from one location, e.g., from one bank of machines to another bank of EGMs, both the old bank controller, i.e., corresponding to the bank of machines to which the machine being moved used to belong, and the new bank controller, i.e., corresponding to the bank of EGMs to which the EGM is being moved, must be reprogrammed to, respectively, remove the EGM from the old bank of EGMs and to identify the EGM in the new bank.

The present invention is aimed at one or more of the problems as set forth above.

SUMMARY OF THE INVENTION AND ADVANTAGES

A system is provided gaming related services to electronic gaming machines (EGMs) through a multipurpose EGM/player tracking device.

In a first aspect of the present invention, multiple multipurpose EGM accounting, monitoring, player tracking devices may be connected to a single server or computer. The multiple EGM/player tracking devices may communicate to various game machines using different communication protocols, such as, SAS, G2S, X-Series, QCOM, GMMS and other EGM specific protocols.

In a second aspect of the present invention, multiple multipurpose EGM/player tracking devices may communicate to an associated EGM using the G2S protocol and may communicate to a remote computer or server using another communications protocol.

In a third aspect of the present invention, the system may communicate to EGMs using the G2S protocol and may communication to the remote computer or server over an Ethernet communications link in another communications protocol, i.e., not G2S. The data communicated to the remote computer or server may include data related to gaming services, including video, streaming video or other multimedia content.

In a fourth aspect of the present invention, a system for providing gaming related services to a first EGM and to a second EGM. The system includes first and second multipurpose EGM/player tracking device and a server computer. The first multipurpose EGM/player tracking device is associated with the first EGM. The first multipurpose EGM/player tracking device has a first port and a second port. The first port of the first multipurpose EGM/player tracking device couples the first multipurpose EGM/player tracking device to the first EGM using a first communications protocol over a first communications link. The second multipurpose EGM/player tracking device is associated with the second EGM. The second multipurpose EGM/player tracking device has a first port and a second port. The first port of the second multipurpose EGM/player tracking device couples the second multipurpose EGM/player tracking device to the second EGM using a second communications protocol over a second communications link. The first and second communication protocols are different. The server computer is coupled to the first and second multipurpose EGM/player tracking device using a system communications protocol through first and second system communications links, respectively. The server computer provides gaming services to users of the first and second EGMs through the first and second multipurpose EGM/player tracking devices, respectively.

In a fifth aspect of the present invention, a system for providing gaming related services to a first EGM and to a second EGM is provided (refer to FIG. 7). The system includes first and second multipurpose EGM/player tracking devices, first and second middleware servers, and a multipurpose EGM/player tracking services database server. The first multipurpose EGM/player tracking device is associated with the first EGM. The first multipurpose EGM/player tracking device has a first port and a second port. The first port of the first multipurpose EGM/player tracking device couples the first multipurpose EGM/player tracking device to the first EGM using a first communications protocol over a first communications link. The first middleware server computer is coupled to the first multipurpose EGM/player tracking device using a system communications protocol through a first system communications link. The second multipurpose EGM/player tracking device is associated with the second EGM. The second multipurpose EGM/player tracking device has a first port and a second port. The first port of the second multipurpose EGM/player tracking device couples the second multipurpose EGM/player tracking device to the second EGM using a second communications protocol over a second communications link. The first and second communication protocols are different. The second middleware server computer is coupled to the second multipurpose EGM/player tracking device using a system communications protocol through a second system communications link. The multipurpose EGM/player tracking services database server computer is connected to the first and second middleware server computers. The multipurpose EGM/Player tracking services database server computer provides gaming services to users of the first and second EGMs through the first and second multipurpose EGM/player tracking devices, respectively.

In a sixth aspect of the present invention, a method provides gaming related services to a first EGM and to a second EGM. The method includes the step of providing a first multipurpose EGM/player tracking device associated with the first EGM. The first multipurpose EGM/player tracking device having a first port and a second port. The first port of the first multipurpose EGM/player tracking device couples the first multipurpose EGM/player tracking device to the first EGM using a first communications protocol over a first communications link. The first multipurpose EGM/player tracking device has an associated IP address. The method includes the step of providing a first middleware server computer coupled to the first multipurpose EGM/player tracking device using a system communications protocol through a first system communications link and providing a second multipurpose EGM/player tracking device associated with the second EGM. The second multipurpose EGM/player tracking device has a first port and a second port. The first port of the second multipurpose EGM/player tracking device couples the second multipurpose EGM/player tracking device to the second EGM using a second communications protocol over a second communications link. The first and second communication protocols are different. The second multipurpose EGM/player tracking device has a second associated IP address. The method also includes the steps of providing a second middleware server computer coupled to the second multipurpose EGM/player tracking device using a system communications protocol through a second system communications link and providing a multipurpose EGM/player tracking services database server computer connected to the first and second middleware server computers. The multipurpose EGM/player tracking services database server computer provides gaming services to users of the first and second EGMs through the first and second advanced gaming devices, respectively. The method further includes the steps of providing a first table in the multipurpose EGM/player tracking services database server computer for storing the first IP address indicating the first multipurpose EGM/player tracking device is connected to the first middleware server and providing a second table in the multipurpose EGM/player tracking services database server computer for storing the second IP address indicating the second multipurpose EGM/player tracking device is connected to the second middleware server. The method further includes the steps of allowing the first EGM and the first multipurpose EGM/player tracking device to be disconnected from the first middleware server and to be connect to the second middleware server and allowing the first IP address to be deleted from the first table and stored in the second table.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

General System Architecture and Operation

With reference to the drawings and in operation (FIG. 1), the present invention provides a system 10 and method for EGM 12 accounting, monitoring, providing other gaming related services, such as, ticking, progressives, gaming attending EGM interaction services; and providing player 24 of an EGM 12 player services, such as, player tracking, points management, Bonusing, multimedia content and entertainment services.

Figure 1:
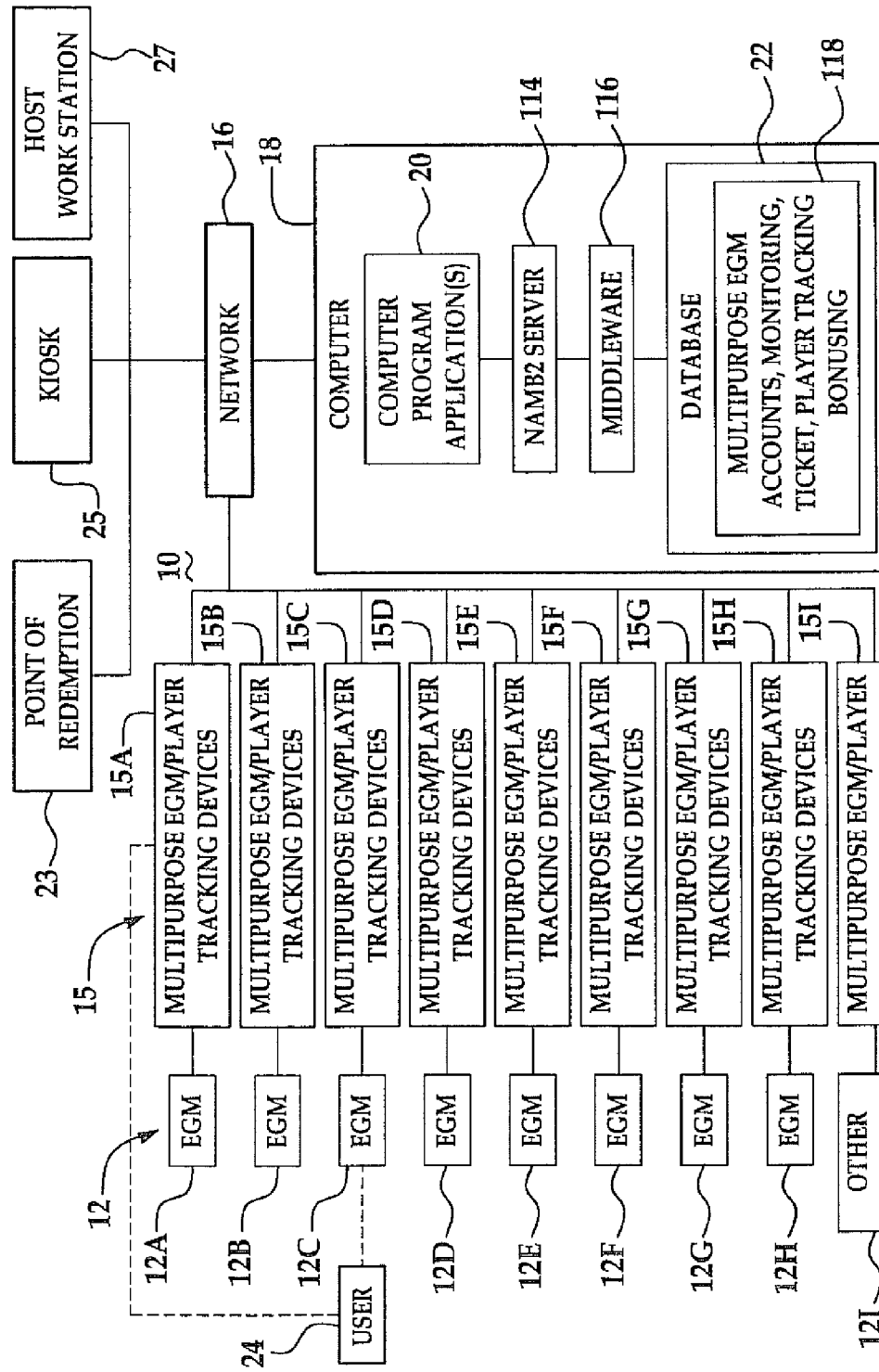
FIG. 1 is block diagram of a system for providing credit to a player of a EGM, according to an embodiment of the present invention.

In one embodiment, the system 10 may be embodied or implemented via an entertaining management and monitoring system which is shown in block diagram form in FIG. 1. The entertainment and monitoring system may include many additional functions such as, real-time multi-site, EGM accounting, EGM monitoring, player tracking, cage credit and vault, sports book, Point of Sale (POS) accounting, keno accounting, bingo accounting, and table game accounting, a wide area progressive jackpot, and electronic funds transfer (EFT), as well as interfaces to other gaming and non-gaming systems. Two such systems are disclosed in U.S. patent application Ser. No. 11/094,605, filed Mar. 30, 2005, which is hereby incorporated by reference.

The entertainment and monitoring system may also track data related to the play of the EGMs 12.

As shown, the system 10 includes a plurality of EGMs 12. Machines 12 may include, but are not limited to EGMs, electronic gaming machines (such as video slot, video poker machines, or video arcade games), multi-terminal electronic gaming machines, server-based gaming machines, virtual EGMs, e.g., for online gaming, and an interface to a table management system (not shown) for table games, or other suitable devices at which a user may interact or access a user or player account. In the illustrated embodiment, eight electronic game machines (EGMs) 12A-12H are shown. However, it should be noted that the present invention is not limited to any number or type of machines 12. In one embodiment, the machines 12 are organized into banks (not shown), each bank containing a plurality of machines 12.

Other types of machines which may be included, such as kiosks 25, point of sale or redemption terminals 23, are indicated with reference number 121.

The EGMs 12 are connected via a network 16 to one or more host computers 18, which are generally located at a remote or central location. The computer 18 includes computer program application(s) 20 which maintains one or more databases 22. In one embodiment, the database(s) are Oracle database(s).

The computer program application(s) 20 and databases 22 may be used to record, track, and report accounting and monitoring information regarding the EGMs 12 and players and/or gaming attendant interaction—user(s) 24 of the EGMs 12. Additionally, the computer program application(s) 20 and databases 22 may be used to maintain information related to player or player tracking accounts (see below).

In general, the machines 12 may be used by a user or player, i.e., to access their player account or services through the multipurpose EGM/player tracking device 15. Examples of player servers consists of but is not limited to accessing and performing operations on (1) point and complementary point balances, (2) accessing and performing operations on awards such as, bonuses, incentives, progressives etc., (3) accessing and performing operations on saved player preferences and account information such as, PIN, default language, show/hide points, and other player and Bonusing features, For example, an EGM 12C is playable by a player 24. The player 24 may select one of the EGMs 12C to play and insert a coin, credit, coupon, and/or player tracking card (not shown) into the chosen EGM 12C. Generally, the EGMs 12C have an associated number of credits or coins required in order to play. In the case of video slot or poker games, the game is played and an award or Bonus in the form of credits or other complementary may be awarded through the multipurpose EGM/player tracking device 15 to the EGM 12. In the case where the user 24 is a gaming attendant, the gaming attendant may interact with the multipurpose EGM/player tracking device to access EGM 12 services, such as, perform a fill, acknowledge a jackpot, link or associate a particular multipurpose EGM/player tracking device to EGM 12, interrogates EGM 12 meters, bill insertions and other access or perform other EGM specific gaming services.

It is important to note that the player 24 or user may utilize the user interface on the EGM/player tracking device 15 to access the EGM 12 and/or the servers 114, 118 in performing various gaming services. In other words, the user interface on the EGM/player tracking device 15 allows the player or the user to access data, information, or services available either on one of the EGM's 12 or one of the servers 114, 118.

Figure 2:
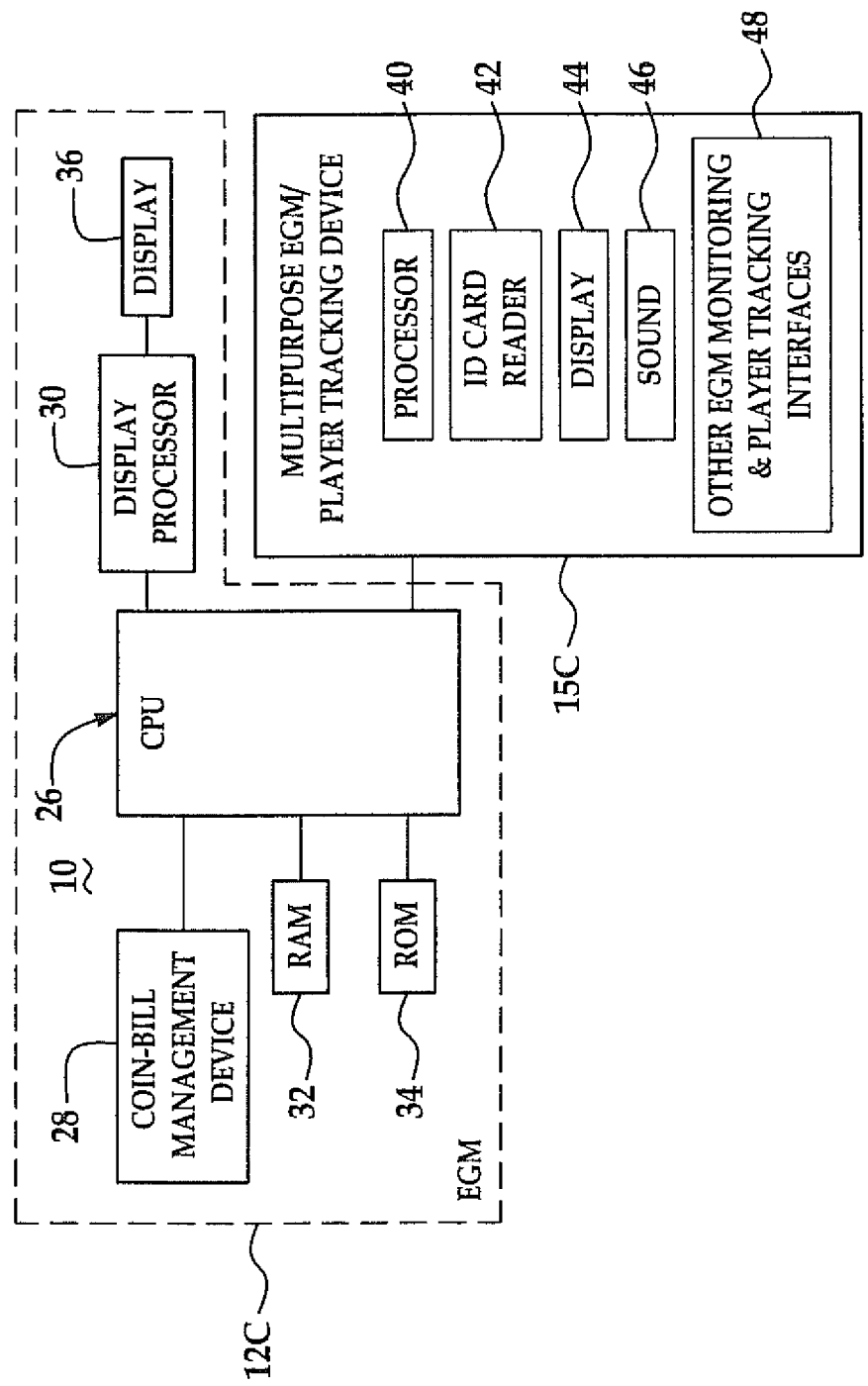
FIG. 2 is a block diagram of a EGM and multipurpose EGM/player tracking device for use with the system of FIG. 1.
Figure 3:
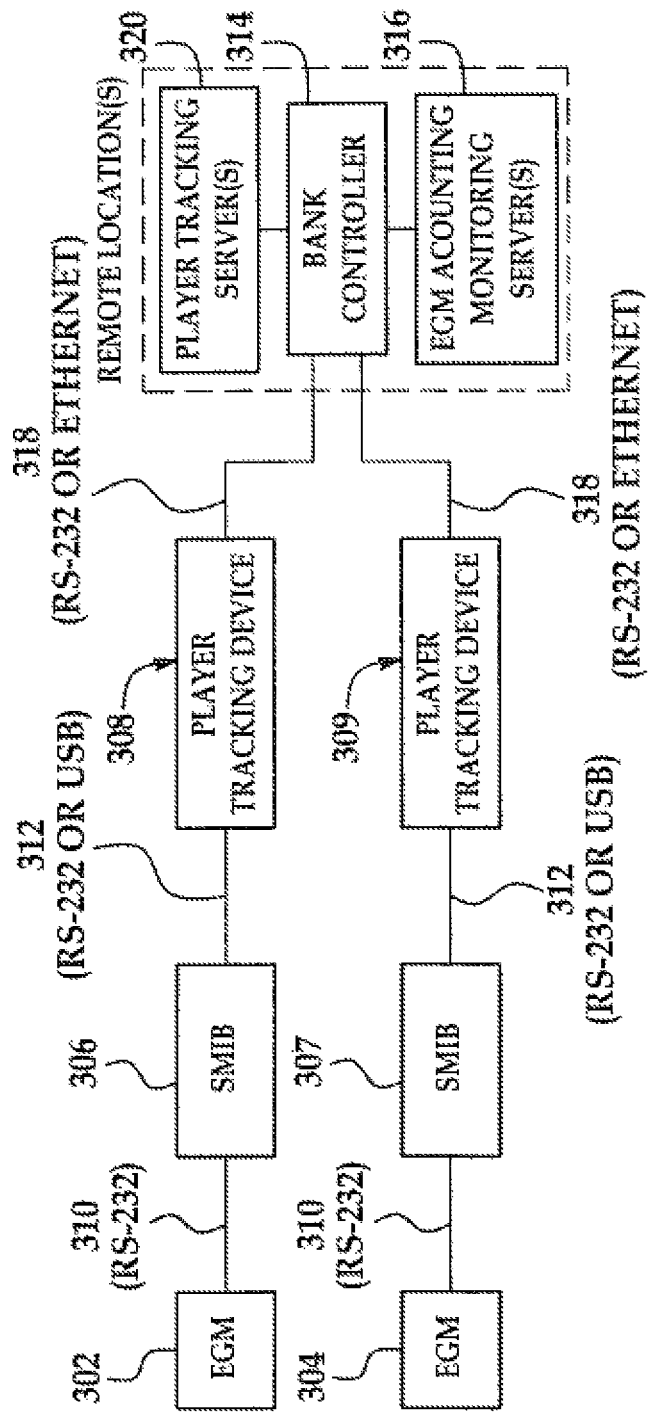
FIG. 3 is a block diagram of a prior art system architecture.
Figure 4:
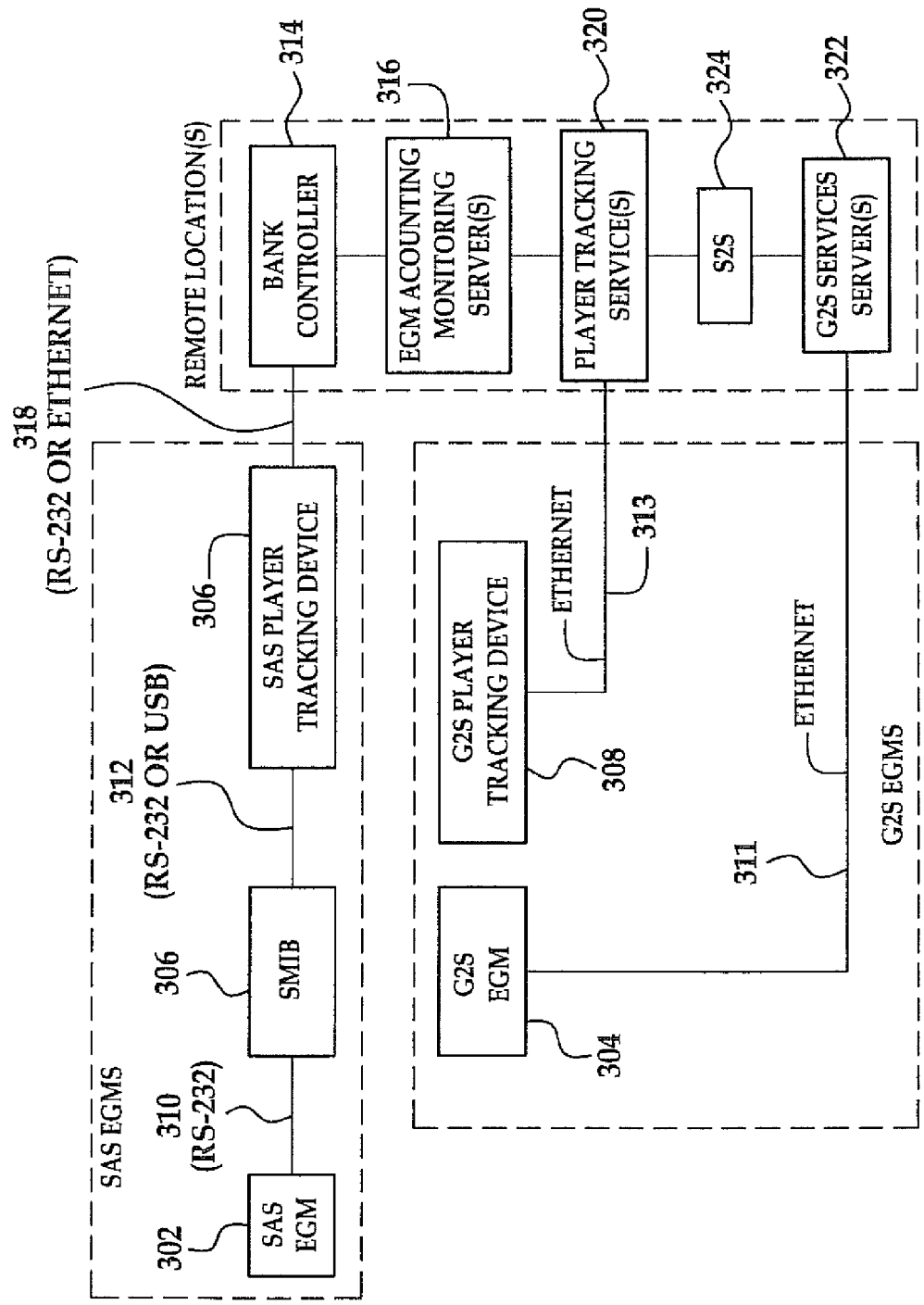
FIG. 4 is a block diagram of an exemplary system architecture which utilizes both the SAS and the G2S protocol.

With reference to FIG. 2, a block diagram of a suitable electronic gaming machine 12C and the associated multipurpose EGM/player tracking device is shown. The communication between the EGM and the EGM/player tracking device 8 may be one of RS232, RS485, Current Loop, Fiber, USB, Ethernet or any other low level communication link.

The EGM 12C comprises a game controller 26, or central processing unit (CPU), a coin-bill management device 28, a display processor 30, a RAM 32 as a memory device and a ROM 34 (generally provided as an EPROM). The CPU 26 is mainly composed of a microprocessor unit and performs various calculations and motion control necessary for the progress of the game. The coin-bill management device 28 detects the insertion of a coin or a bill and performs a necessary process for managing the coin and the bill. The display processor 30 interprets commands issued from the CPU 26 and displays desirable images on a display 36. The RAM 32 temporarily stores programs and data necessary for the progress of the game, and the ROM 34 stores, in advance, programs and data for controlling basic operation of the EGM 12C, such as the booting operation thereof, game code and graphics.

Input to the EGM 12C may be accomplished via mechanical switches or buttons or via a touchscreen interface (not shown). Such EGMs 12 are well known in the art and are therefore not further discussed.

The player or gaming attendant user 24 is identified via a player tracking card and/or any other method of identifying the player or gaming attendant, such as, finger print, optical recognition, etc., into multipurpose EGM/player tracking device 38 at each EGM 12 (see below). Player tracking accounts may be used, generally, to provide bonuses to a player, in addition to the award designated by, in the case of a video slot or poker machine, the EGM's 12 paytable. These bonuses may be awarded to the player 24 based a set of criteria, including, but not limited to, a) the player's play on the EGM 12C, b) the player's overall play, c) play during a predetermined period of time, and d) the player's birthday or anniversary, or e) any other definable criteria. Additionally, bonuses may be awarded on a random basis, i.e., to a randomly chosen player or randomly chosen game 12. Bonuses may also be awarded in a discretionary manner or based on other criteria, such as, purchases made at a gift shop or other affiliated location. Additionally, bonus may be award to the player 24 from any other gaming or non-gaming source, such as, Point of Service (POS), Property Management Systems (PMS), Kiosks, or any other interfaced external system.

In one embodiment, the player tracking device 38 includes a processor 40, a player identification card reader 42 and/or a numeric keypad (not show), a display 44, a sound project device 46 and other EGM monitoring and player/gaming attendant tracking interfaces 48. In one embodiment, the display 46 is a touchscreen panel and the numeric keypad (not show) is implemented thereon.

The player 24 may be identified by entry of a player tracking card into the player identification card reader 42 and/or entry of a player identification number (PIN) on the numeric key pad or touch screen panel display 46 or any other method of identifying the player or gaming attendant, such as, finger print, optical recognition, etc. The play tracking device 38 may also be used to communicate information between the computer 18 (FIG. 1) and the corresponding EGM 12C. The multipurpose EGM/player tracking device 38 may also be used to track bonus points, i.e., incentive points or credits, downloaded from the computer 18 (FIG. 1).

System Architecture to Incorporate High Data Volume System Services

Figure 5:
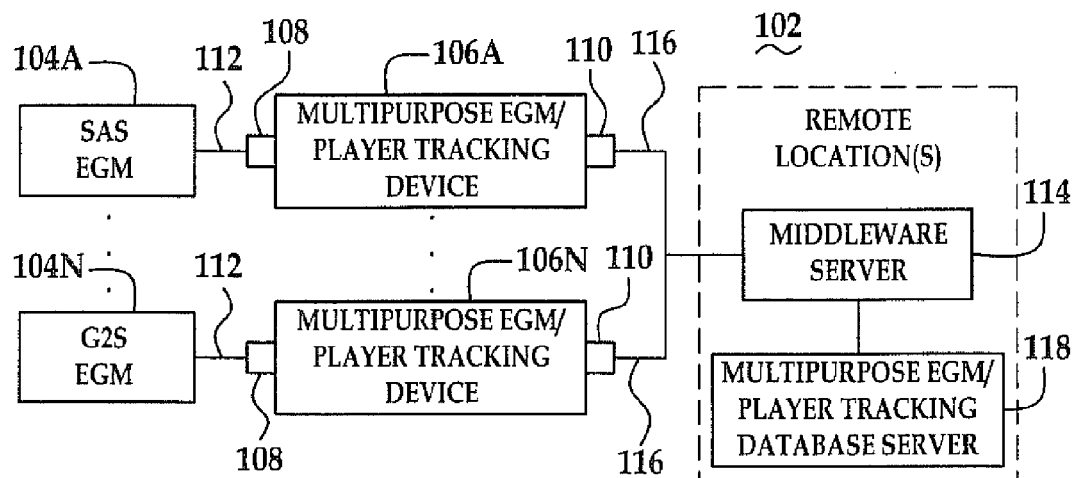
FIG. 5 is a block diagram of a system architecture which utilizes both SAS and G2S protocols in conjunction with the multipurpose EGM/player tracking device and system, according to an embodiment of the present invention.
Figure 6A:
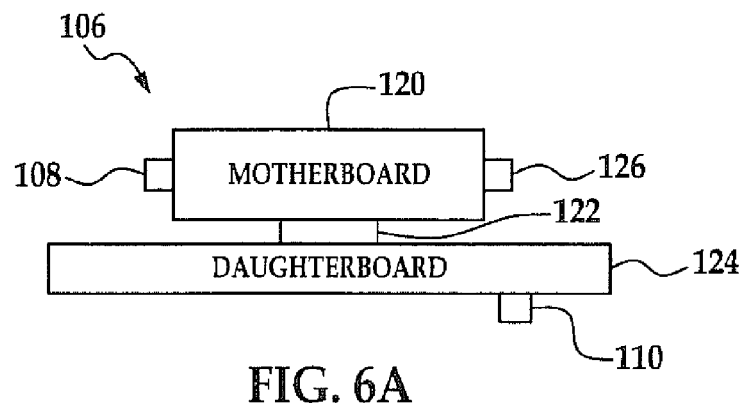
FIG. 6 is a block diagram of the multipurpose EGM/player tracking device for use with the system architecture of FIG. 5, according to an embodiment of the present invention.
Figure 6B:
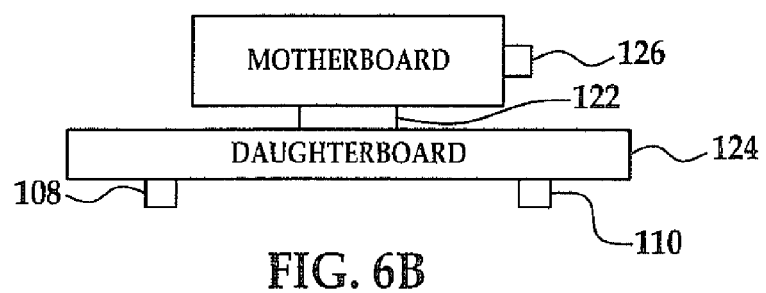

With reference to FIGS. 5, 6A and 6B, the present invention provides a system architecture 102 which is capable of handling the large data bandwidth required by evolving system services. For example, the system architecture 102 may communicate with game machines 104A-104n through any legacy communications protocol, e.g., SAS, or superSAS, X-Series, QCOM, GMMS, as well as higher bandwidth protocols, such as G2S.

In the illustrated embodiment, each game machine 104A, 104n has an associated multipurpose EGM/player tracking device 106A, 106n. As discussed above, multipurpose EGM/player tracking device 106A, 106n may includes a processor 40, a display 44 and may include an ID card reader 42 and/or numeric keypad (which may be implemented via a physical keypad or touchscreen buttons implemented on the display 44), a sound project device 46 and other EGM monitoring and player tracking interfaces 48. It should be noted that ID card reader 42, display 44, and numeric keypad are used to implement a user interface which is used to communicate data and receive inputs from users (generally, casino employees) or patrons or players. However, other types of user interfaces may be incorporated into the system architecture 102 without departing from the spirit of the invention.

Returning to FIGS. 5 and 6, each multipurpose EGM/player tracking device 106A, 106B includes a first port 108 and a second port 110. The first port 108 is used to communicate with the corresponding game machine 104A, 104n over a communications link 112 (see below). The second port 110 is used to communicate with a middleware server 114 over a second communications link 116. In the illustrated embodiment, the second communications link 116 is an Ethernet link. Data is communicated over the second communications link 116 in data packets in a system communications protocol. Data over the system communications protocol is much more condensed than in the XML format of G2S. Thus, data, including game software in downloadable gaming systems, meter information, accounting information, progressive information, video, and the like, may all be communicated over the Ethernet connections between the middleware server 114 to the game machines 104A, 104n through the multipurpose EGM/player tracking devices 106A, 106n. Thus, only one set of wires or cables, e.g., an Ethernet cable, need to be provided between each multipurpose EGM/player tracking device 106A, 106n.

Typically, the system architecture 102 will include a plurality of middleware servers 114, each having an associated plurality of game machines 104A, 104n. The middleware servers 114 act as go-between between the associated game machines 104A, 104n and multipurpose EGM/player tracking devices 106A, 106n and one or more multipurpose EGM/ player tracking services database servers 118 which are used to provide game services, e.g., progressive awards, player tracking services, accounting services, and the like.

The communications protocol used by each game machine 104A, 104n, may be different even among game machines 104A, 104n associated with the same middleware server 114.

For example, if one of the game machines 104A communicates using the SAS protocol, then the associated data link 112 is an RS-232 link and the associated multipurpose EGM/player tracking device 106A communicates with the game machines 104A using the SAS protocol over the RS-232 link. Further, if another of the game machines 104n is a G2S device, i.e., communicates using the G2S protocol, then the associated data link 112 is an Ethernet link and the associated player tracking device 106n communicates with the associated game machine 104n over the Ethernet link 112 using the G2S protocol.

It should also be noted that even if the another game machine 104n is a G2S machine and it communicates to the associated multipurpose EGM/player tracking device 106n, the G2S protocol is not used to communicate to the middleware server 114. As discussed above, data is communicated to the middleware server over an Ethernet link in data packets in a much more condensed format.

Thus, the present invention provides a system architecture which is more flexible, e.g., EGMs which require communication using different communication protocols, e.g., SAS and/or G2S may be mixed and match in the same area or bank and associated with the same middleware. Furthermore, the present invention, provides a system architecture which may communicate with game machines which require use of a communication protocol which requires a high bandwidth, e.g., the G2S protocol without require multiple communication links from the EGMs and/or associated device back to a computer or server at a remote location.

With specific reference to FIGS. 6A and 6B, an exemplary embodiment of a multipurpose EGM/player tracking device 106, according to one embodiment is shown. In the illustrated embodiment, the multipurpose EGM/player tracking device 106 includes two pc boards, a motherboard 120 and a daughterboard 122. In one aspect, the motherboard 120 is a standard, off-the shelf component, such as an Intel or AMD processor based small form factor (SFF) motherboard with a standard ETX socket 122. The motherboard 120 may run on a standard operating system, such as Microsoft Windows, Vista, Linux/BSD or Unix. The daughterboard 122 connects to the motherboard 120 via the ETX socket 122.

In one embodiment, the daughterboard 124 is a specially designed component and includes the second port 110. The second port 110 is generally an Ethernet port and is used to connect the multipurpose EGM/player tracking device 106 to a computer or server, e.g., the middleware server 114.

In one embodiment, as shown in FIG. 6A, the first port 108 is provided on the motherboard 108. In another embodiment, as shown in FIG. 6B, the first port 108 is provided on the daughterboard 108. The first port 108 is used to connect the multipurpose EGM/player tracking device 106 to the associated game machine 104A, 104n. In one embodiment, the is a dual-purpose port, which may for example by used to implement two different communication links, e.g., RS-232 and a current loop communications link.

In one embodiment, the multipurpose EGM/player tracking device 106 may communicate with the game machine 104 using any communications protocol. Thus, the daughterboard 124 includes the circuitry to implement multiple communications links, including for example, RS-232, RS-485, Ethernet, current loops, fiber optics, USB etc. . . . Each daughterboard 124 includes a location where the appropriate type of port may be physically affixed to the board. Through software and with the appropriate software driver, the multipurpose EGM/player tracking device 106 detects the appropriate communications protocol to communicate with the attached/associated game machine 104A, 104n.

In another aspect of the present invention, data is communicated between the middleware server 114 and the multipurpose EGM/player tracking devices 106A, 106n and/or game machines 104A, 104n using the TCP/IP protocol. Thus, each multipurpose EGM/player tracking device 106A, 106n has an Internet Protocol (IP) address. If a game machine 104A, 104n and the associated multipurpose EGM/player tracking device 106A, 106n are moved from one location to another, and thus, must be connected to a different middleware server 114, the IP address of the moved EGM must only be moved within the multipurpose EGM/player tracking services database server 118, accomplished automatically or by a database record change.

In one aspect of the present invention, the motherboard 120 drives the display 44 through an appropriate port (not shown), such as a VGA port. Additionally, another port, e.g., another VGA port 126 may also be provided by the multipurpose EGM/player tracking device 106A, 106n, to drive an additional display (not shown). The additional display may be on the EGM 104A, 104n, or external to the EGM or an external display. The additional display may be used, e.g., to show or play data, e.g., (without limitation) graphics, video, animations, pictures, sound, etc. . . . , which may be related to a particular EGM 104A, 104n, related to a bank or group of EGMs (such as for a Progressive Game), or for another purpose. The additional display may be a large display, e.g., a plasma or LCD display which is located a distance away from the EGMs 104A, 104n. The additional VGA port may be provide on the motherboard, the daughterboard or other circuit board.

Figure 7:
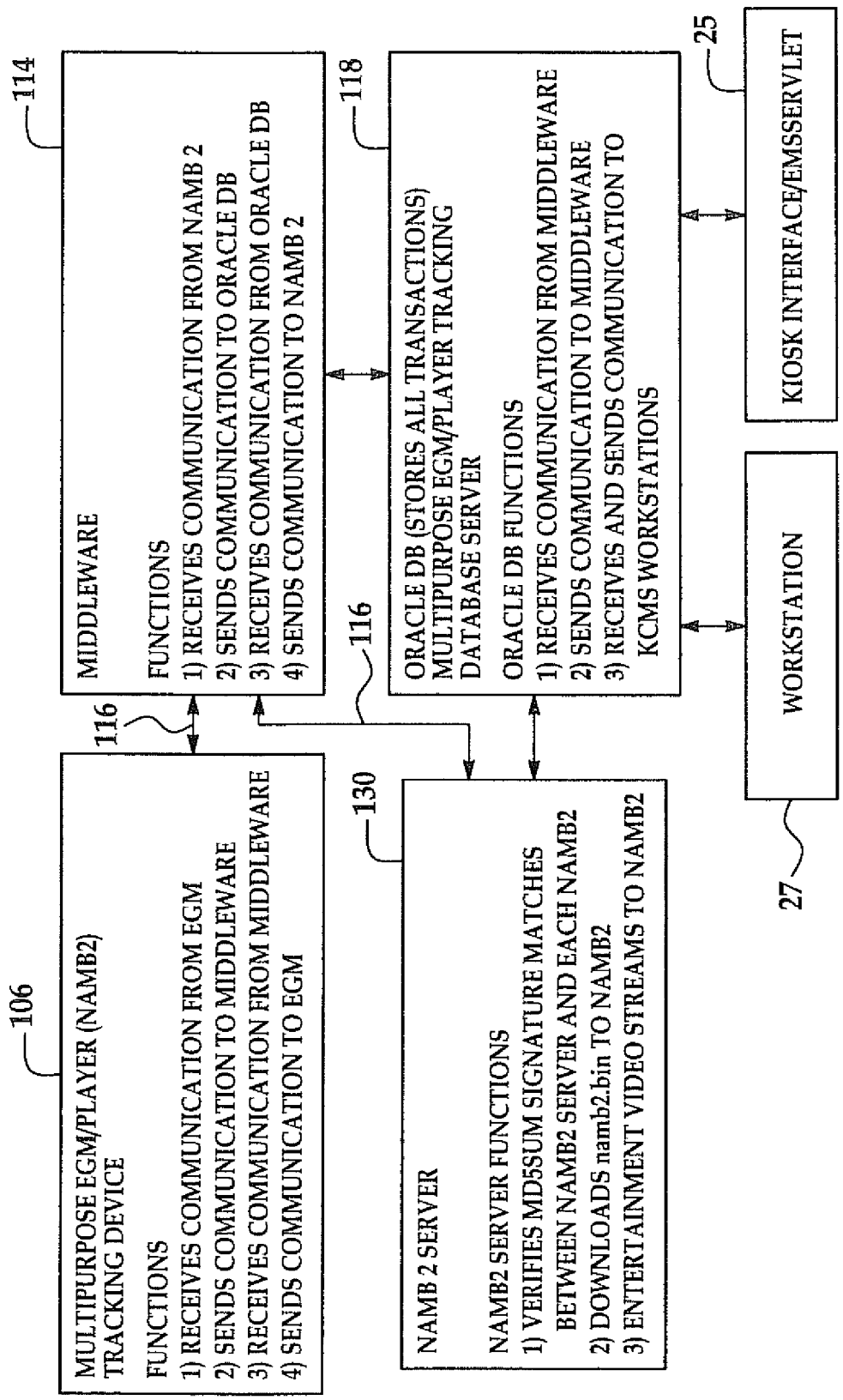
FIG. 7 is a functional block diagram of a system for providing gaming and player tracking services to users of EGMs, according to an embodiment of the present invention.

With particular reference to FIG. 7, a functional block diagram of an exemplary system 10 is shown. Each multipurpose EGM/player tracking device (or NAMB2) 106, performs but is not limited to the following functions: (1) receives communications from the respective electronic gaming device or machine (EGM) 12, (2) sends communications to a respective middleware server 114, (3) receives communications from the respective middleware server 114, and (4) sends communications to the respective electronic EGM 12.

Each middleware server 114 performs but is not limited to the following functions: (1) communicates with the multipurpose EGM/player tracking devices 106, and (2) communicates with the multipurpose EGM/player tracking services database server 118, which in the illustrated embodiment is an Oracle multipurpose EGM/player tracking services database server.

The system 10 may include multiple multipurpose EGM/player tracking services database server 118 for performing various functions. For example, one multipurpose EGM/player tracking services database server 118 may perform accounting functions, e.g., storing every transaction between a user or player and the gaming devices or machines 12. In addition, the multipurpose EGM/player tracking services database servers 118 performs but is not limited to the following functions: (1) receives communications from the middleware servers 118, (2) sends communications to the middleware servers 118, and (3) sends and receives communications to and from workstations 27 and kiosks 25.

In the illustrated embodiment, a NAMB2 server 130 may also be provided. The NAMB2 server 130 may be used to download software executables to each multipurpose EGM/ player tracking device 106 and uses a checksum process (e.g., MD5SUM signature) to verify the software. The NAMB2 server 130 may also provide entertainment audio or video streams to each multipurpose EGM/player tracking device 106 over the communications link 116 as well as other player and gaming attendant services such as, remote help, Internet access, and non-gaming revenue services such as, reservations, valet, shopping, and others.

In one embodiment, the motherboard 120 is an ETX module having an ETX type connector. In the illustrated embodiment, the motherboard 120 has the following specifications:
- Main processor: Intel Celeron M Processor ULV (600 MHz or 1.0 Ghz)
- Chipset: Intel 82855GME/82801DB, 400 MHz, Integrated Graphics
- Main Memory: 256 MB DDR266-SDRAM
- Non-Volatile Memory: 256 KB SRAM
- LAN: 10/100 Based Ethernet (for communication to servers 118, 130), optional $2^{nd}$ 10/100 Based Ethernet for G2S communication
- Serial Port: RS232/Current-Loop/RS485/RS422 Level x1 (for SAS communication), TTL Level x1 (for I/O Processor Communication)
- Video: LVDS x1 (for 6/2" Full-color LCF), Analog Video (VGA) x1 (for optional use).
- Audio: 250 mW (Max) Spearker Out x1 (monaural)
- MIO: PS/2 Mouse x1 (for touch panel control), PS/2 keyboard x1 (for debug)
- Optional Interface: Mini-PCI x1, USB 2.0 x2, Primary IDE x1, I2C x1, I2C x1, GPIO x6

The daughterboard 124 also includes a processor and, in the illustrated embodiment, has the following specifications:
- I/O Process: Freescale MC9S 12A64 25 MHz
- Serial Port: TTL Level x1 (for Main Processor Communications), RS232 Level x1 (for optional use)
- Peripheral Interfaces: VFD, Keypad, Card Reader, Door Switch In x4, Key Switch Out x2, Fan Monitor, Temperature Sensor
- Optional Interface GPIO x11, GPO x4

Figure 8:
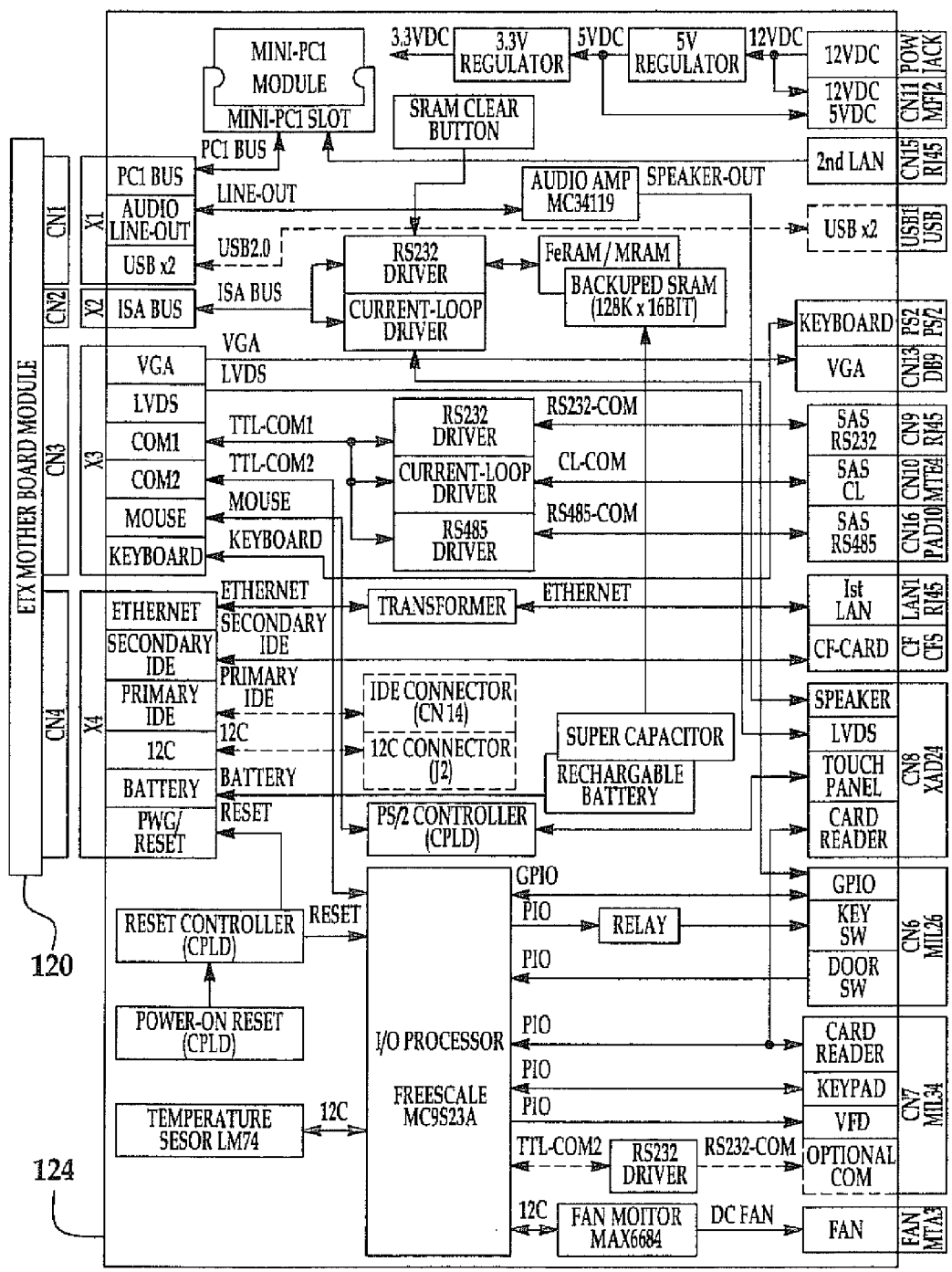
FIG. 8 is a block diagram of a mother-board of the multipurpose EGM/player tracking device, according to an embodiment of the present invention.
Figure 9:
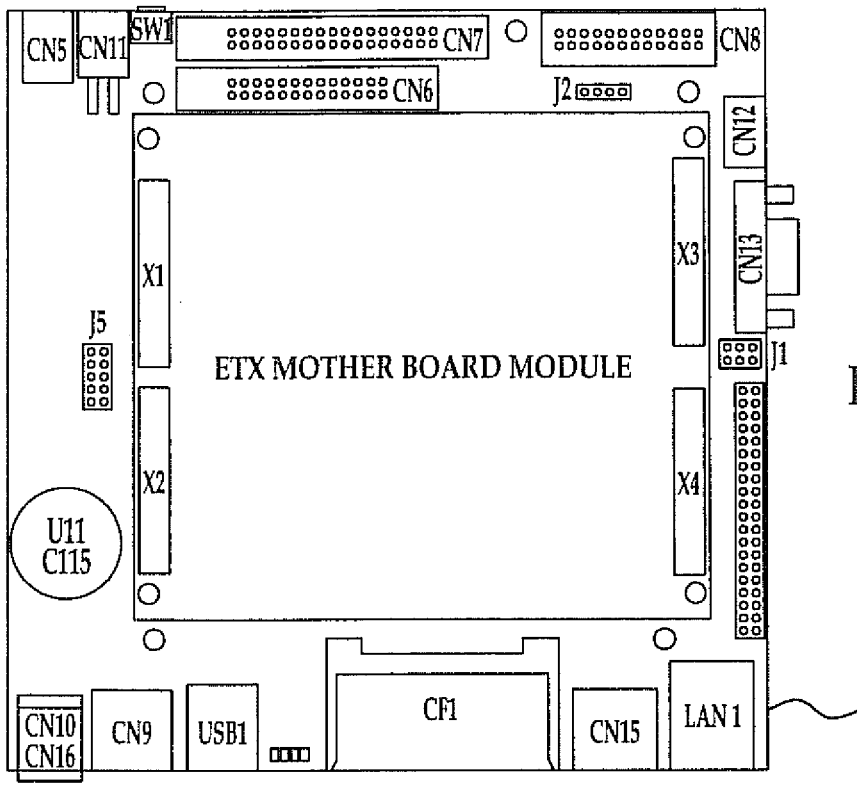
FIG. 9 is a board layout view of a daughter board of an multipurpose EGM/player tracking device, according to an embodiment of the present invention.
Figure 10:
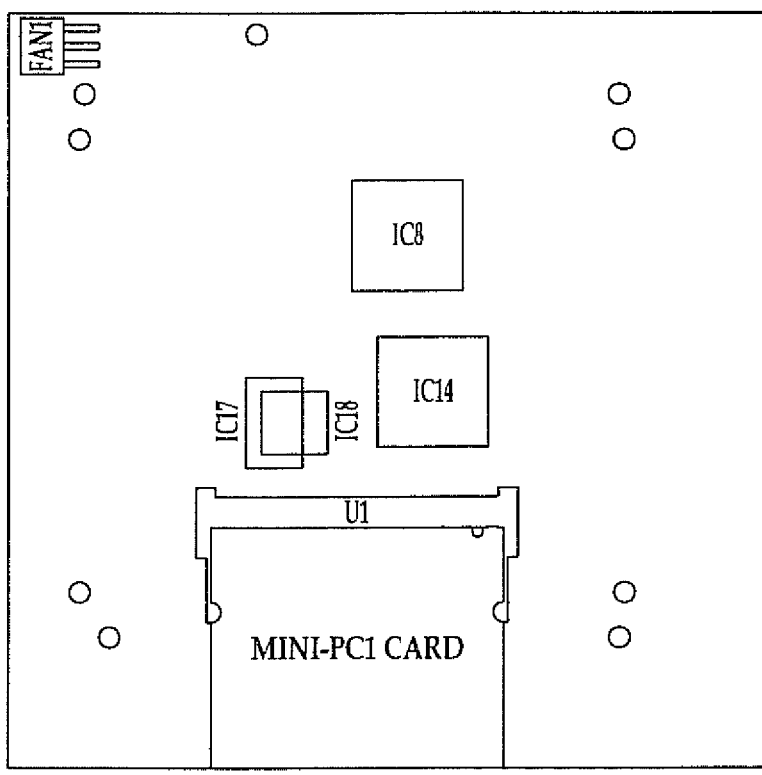
FIG. 10 is a bottom view of the daughter board of FIG. 9.

FIG. 8 is a functional block diagram of the daughterboard 124, according to an embodiment of the present invention. FIGS. 9 and 10 are top and bottom views of a board layout of the daughterboard.

The components are labeled as follows:
- CN5: 12 VDC power input connector
- CN6: I/O connector for EGM door detections and key switch controls
- CN7: Player interface connector for card reader, VFD and keypad
- CN8: Player interface connector for card reader, speaker, 6.2" full-color LCD and touch panel
- CN9: RS232C SAS interface connector
- CN10: Current loop SAS interface connector (CN16 is excluded, if CN10 is populated.)
- CN11: 12 VDC/5 VDC power output connector
- CN12: PS/2 keyboard connector
- CN13: VGA connector
- CN14: IDE connector (Option)
- CN15: Secondary LAN connector (This connector is activated, if Mini-PCI LAN controller is installed.)
- CN16: RS485 SAS interface connector (CN10 is excluded, if CN16 is populated.)
- CF1: Compact Flash socket
- LAN1: Primary LAN connector
- USB1: USB connector x2 (Option)
- X1-X4: ETX module connectors
- J1: JTAG connector for I/O processor
- J2: I2C connector (Option)
- U11/C115: SuperCapacitor or rechargeable battery
- LED1-4: LED indicators
- J5: JTAG connector for Altera CPLD
- SW1: NVRAM clear switch
- FAN1: Fan connector
- U1: Mini-PCI card connector
- IC8: I/O processor
- IC14: Altera CPLD
- IC17: SRAM or MRAM for NVRAM (IC18 is excluded, if IC17 is populated.)
- IC18: FeRAM for NVRAM (IC 17 is excluded, if IC18 is populated.)

Figure 11:
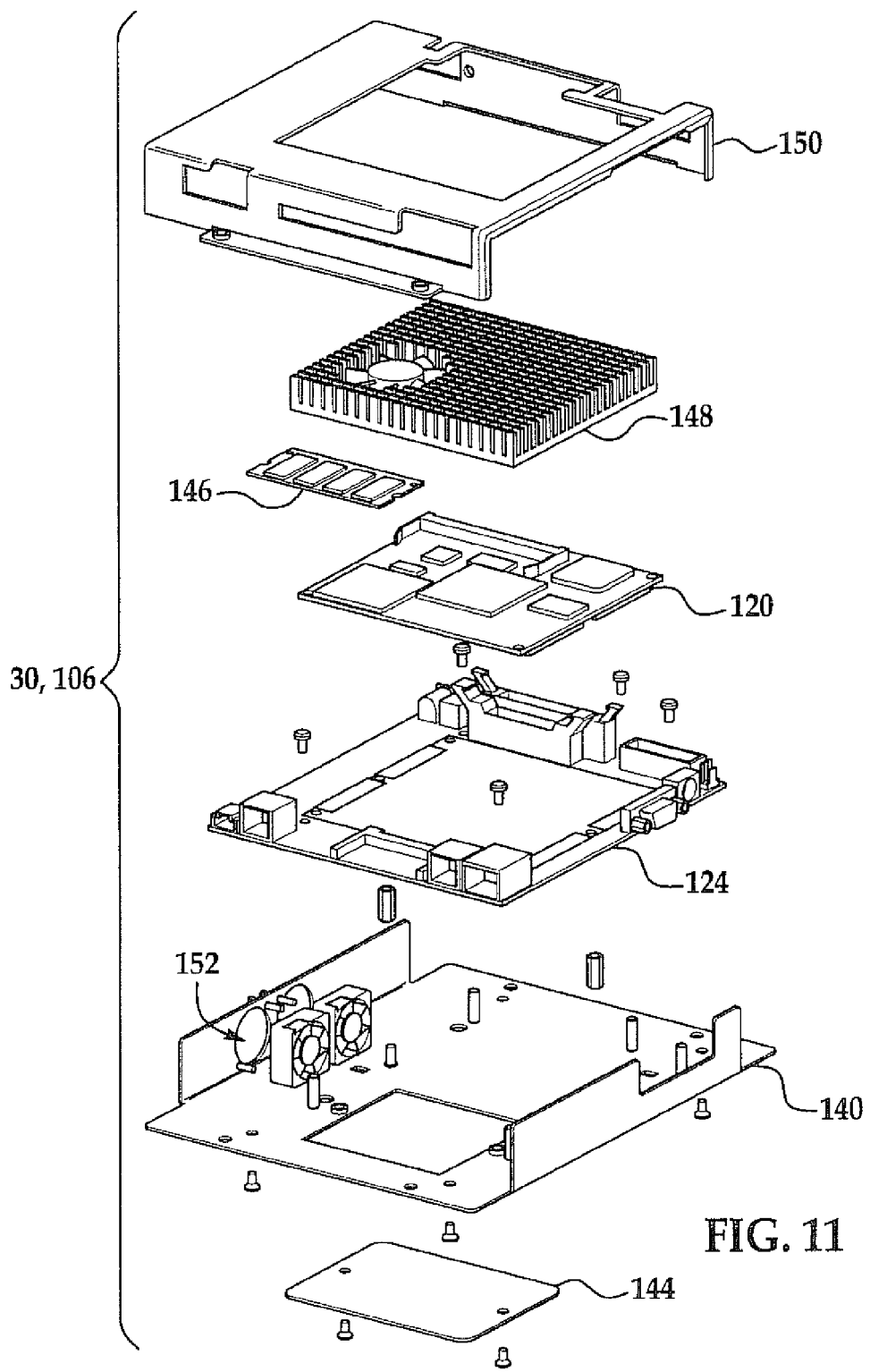
FIG. 11 is an assembly view of the multipurpose EGM/player tracking device according to an embodiment of the present invention.

With particular reference to FIG. 11, an assembly view of the multipurpose EGM/player tracking device 38, 106 according to an embodiment of the present invention is shown. The multipurpose EGM/player tracking device 38, 106 includes a housing base 140 and an access plate 144. Two cooling fans 152 are mounted to the house base 140. The daughterboard 124 is mounted to the housing base 140 by posts and fasteners in a conventional manner. The motherboard 120 is connected to the daughterboard 124 by the ETX connector and fastened into place. A memory module 146 is inserted into a memory slot on the motherboard 120. An ETX heat sink with a fan 148 is coupled to the motherboard 120 in a conventional manner. A cover 150 is mounted to the housing base 140.

Generally, the system 10 as illustrated in FIG. 1 is a (casino) in-house EGM/player tracking monitoring system which provides, inter alia, the following gaming services: data gathering, report generating, player tracking, player promotion, and cashless gaming functions, such as ticket-in ticket-out (TITO). All data collected from the EGMs or devices 12 such as meters, security status, ticket transactions, and player & attendant interaction activities are transmitted via the TCP/IP to a middleware server 114 and from there to a multipurpose EGM/player tracking services database server 118, where it is stored. The information stored on the multipurpose EGM/player tracking services database server 118 can be accessed via the front-end user interface of a workstation 27 for payout verification, EGM monitoring and maintenance, player tracking, reporting, accounting and marketing. The system 10 may also be able to stream and/or download multimedia files and videos from a true-time server, e.g., the NAMB 2 server 130 to the player tracking LCD display 44. The NAMB 2 server 130 may be used to verify and download the software which runs on the multipurpose EGM/player tracking devices 38,106.

In one embodiment of the present invention, the multipurpose EGM/player tracking device software is stored on board the multipurpose EGM/player tracking device 106 on a compact flash memory module. An auto-update feature for the software may be enabled or disabled. However, once the software is updated, a checksum algorithm is run to ensure the validity, including the correct version, of the software. Additionally, the checksum algorithm remains active for a set period of time, e.g., 30 minutes, after successful download and re-run during or at the end of this period.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed:

1. A system for providing gaming related services to a first EGM and to a second EGM, comprising:
   a first multipurpose EGM/player tracking device being coupled with the first EGM using a first communications protocol over a first communications link;
   a first middleware server computer being coupled to the first multipurpose EGM/player tracking device using a system communications protocol through a first system communications link;
   a second multipurpose EGM/player tracking device being coupled with the second EGM using a second communications protocol over a second communications link, the first and second communications protocol being different;
   a second middleware server computer being coupled to the second multipurpose EGM/player tracking device using the system communications protocol through a second system communications link; and,
   a multipurpose EGM/player tracking services database server computer connected to the first and second middleware server computers for providing gaming services to users of the first EGM through the first multipurpose EGM/player tracking device and the first middleware server and to users of the second EGM through the second multipurpose EGM/player tracking device and the second middleware server, respectively, wherein each of the first and the second multipurpose EGM/player tracking devices has an associated IP address, the multipurpose EGM/player tracking services database server having a first table associated with the first middleware server, the IP address of the first multipurpose EGM/player tracking device being stored within the first table, the multipurpose EGM/player tracking services database server having a second table associated with the second middleware server, the IP address of the second multipurpose EGM/player tracking device being stored within the second table, the multipurpose EGM/player tracking services database for allowing the first EGM and the first multipurpose EGM/player tracking device to be disconnected from the first middleware server and to be connected to the second middleware server with the first IP address being deleted from the first table and stored in the second table.

2. A system for providing gaming related services to a first electronic gaming machine (EGM) and to a second EGM, comprising:
   a plurality of multipurpose EGM/player tracking devices, each multipurpose EGM/player tracking device configurable to communicate with a corresponding EGM using a plurality of communications protocols, the plurality of multipurpose EGM/player tracking devices including:
      a first one of the plurality of multipurpose EGM/player tracking devices associated with the first EGM, the first multipurpose EGM/player tracking device having a first port and a second port, the first port of the first multipurpose EGM/player tracking device for coupling the first multipurpose EGM/player tracking device to the first EGM with a first communications link, the first multipurpose EGM/player tracking device configured to communicate with the first EGM using a first communications protocol; and
      a second one of the plurality of multipurpose EGM/player tracking devices associated with the second EGM, the second multipurpose EGM/player tracking device having a first port and a second port, the first port of the second multipurpose EGM/player tracking device for coupling the second multipurpose EGM/player tracking device to the second EGM with a second communications link, the second multipurpose EGM/player tracking device configured to communicate with the second EGM using a second communications protocol that is different than the first communications protocol;
   a plurality of middleware server computers including a first middleware server computer and a second middleware server computer, the first middleware server computer being coupled to the first multipurpose EGM/player tracking device and the second middleware server computer being coupled to the second multipurpose EGM/player tracking device, each of the first middle server computer and the second middleware server computer using a system communications protocol; and,
   a multipurpose EGM/player tracking services database server connected to the first and second middleware server computers for providing gaming services to users of the first and second EGMs, through the first and second multipurpose EGM/player tracking devices, respectively, each of the first and the second multipurpose EGM/player tracking devices has an associated IP address, the multipurpose EGM/player tracking services database server having a first table associated with the first middleware server and a second table associated with the second middleware server, the IP address of the first multipurpose EGM/player tracking device being stored within the first table and the IP address of the second multipurpose EGM/player tracking device being stored within the second table to enable the first EGM and the first multipurpose EGM/player tracking device to be disconnected from the first middleware server and to be connected to the second middleware server by transferring the first IP address from the first table to the second table.

3. A system, as set forth in claim 2, wherein the system communications link is an Ethernet link.

4. A system, as set forth in claim 3, wherein the system communications protocol is TCP/IP.

5. A system, as set forth in claim 2, wherein the first communications protocol is one of SAS, superSAS, and G2S and the second communications protocol is a different one of SAS, superSAS, and G2S.

6. A system, as set forth in claim 2, wherein the first middleware server computer is coupled to the first multipurpose EGM/player tracking device with a first system communications link and the second middleware server is coupled to the second multipurpose EGM/player tracking device with a second system communications link.

7. A system, as set forth in claim 2, wherein the gaming services includes one or more of the progressive awards, player tracking services, accounting services, and the like.

8. A system, as set forth in claim 1, wherein the first communications protocol is SAS communicated over a RS-232 link and the second communications protocol is G2S communicated over an Ethernet link.

9. A system, as set forth in claim 2, wherein the first and second multipurpose EGM/player tracking devices each include:
   a motherboard having an onboard processor and a socket, the first port being connected to the motherboard; and,
   a daughterboard being connected to the socket of the motherboard, the second port being connected to the daughterboard.

10. A system, as set forth in claim 9, wherein the socket is an ETX socket.

11. A system, as set forth in claim 2, wherein the first port is a dual purpose port.

12. A system, as set forth in 2, wherein the multipurpose EGM/player tracking devices includes a plurality of first ports, each first port implementing a different type of communications link.

13. A system, as set forth in claim 12, wherein each first port implements one of the following types of communication ports: RS-232, RS-485, Ethernet, current loop, fiber optic, USB.

14. A system for providing gaming related services to a first electronic gaming machine (EGM) and to a second EGM, comprising:
   a plurality of multipurpose EGM/player tracking devices, each multipurpose EGM/player tracking device configurable to communicate with a corresponding EGM using a plurality of communications protocols, the plurality of multipurpose EGM/player tracking devices including:
      a first one of the plurality of multipurpose EGM/player tracking devices associated with the first EGM, the first multipurpose EGM/player tracking device having a first port and a second port, the first port of the first multipurpose EGM/player tracking device for coupling the first multipurpose EGM/player tracking device to the first EGM with a first communications link, the first multipurpose EGM/player tracking device configured to communicate with the first EGM using a first communications protocol; and
      a second one of the plurality of multipurpose EGM/player tracking devices associated with the second EGM, the second multipurpose EGM/player tracking device having a first port and a second port, the first port of the second multipurpose EGM/player tracking device for coupling the second multipurpose EGM/player tracking device to the second EGM with a second communications link, the second multipurpose EGM/player tracking device configured to communicate with the second EGM using a second communications protocol that is different than the first communications protocol;
   a first middleware server computer being coupled to the first multipurpose EGM/player tracking device with a first system communications link, the first multipurpose EGM/player tracking device configured to communicate with the first middleware server computer using a system communications protocol;
   a second middleware server computer being coupled to the second multipurpose EGM/player tracking device with a second system communications link, the second multipurpose EGM/player tracking device configured to communicate with the second middleware server computer using the system communications protocol; and,
   a multipurpose EGM/player tracking services database server computer connected to the first and second middleware server computers, the multipurpose EGM/player tracking services database server computer for providing gaming services to users of the first EGM through the first multipurpose EGM/player tracking device and the first middleware server and to users of the second EGM through the second multipurpose EGM/player tracking device and the second middleware server, respectively, wherein each of the first and the second multipurpose EGM/player tracking devices has an associated IP address, the multipurpose EGM/player tracking services database server having a first table associated with the first middleware server, the IP address of the first multipurpose EGM/player tracking device being stored within the first table, the multipurpose EGM/player tracking services database server having a second table associated with the second middleware server, the IP address of the second multipurpose EGM/player tracking device being stored within the second table, the first and second table for allowing the first EGM and the first multipurpose EGM/player tracking device to be disconnected from the first middleware server and to be connected to the second middleware server by deleting the first IP address from the first table and storing the first IP address in the second table.

15. A system, as set forth in claim 14, wherein the system communications link is an Ethernet link.

16. A system, as set forth in claim 15, wherein the system communications protocol is TCP/IP.

17. A system, as set forth in claim 14, wherein the first communications protocol is one of SAS, superSAS, and G2S and the second communications protocol is a different one of SAS, superSAS, and G2S.

18. A system, as set forth in claim 14, wherein the server communicates with a multipurpose EGM/player tracking services database server, the multipurpose EGM/player tracking services database server provides the gaming services to the users.

19. A system, as set forth in claim 14, wherein the gaming services includes one or more of the progressive awards, player tracking services, accounting services, and the like.

20. A system, as set forth in claim 14, wherein the first communications protocol is SAS communicated over a RS-232 link and the second communications protocol is G2S communicated over an Ethernet link.

21. A system, as set forth in claim 14, wherein the first and second multipurpose EGM/player tracking devices each include:
   a motherboard having an onboard processor and a socket, the first port being connected to the motherboard; and,
   a daughterboard being connected to the socket of the motherboard, the second port being connected to the daughterboard.

22. A system, as set forth in claim 21, wherein the socket is an ETX socket.

23. A system, as set forth in claim 14, wherein the first port is a dual purpose port.

24. A system, as set forth in 14, wherein the multipurpose EGM/player tracking devices includes a plurality of first ports, each first port implementing a different type of communications link.

25. A system, as set forth in claim 23, wherein each first port implements one of the following types of communication ports: RS-232, RS-485, Ethernet, current loop, fiber optic.

26. A method for providing gaming related services to a first electronic gaming machine (EGM) and to a second EGM, comprising:
   providing a first multipurpose EGM/player tracking device associated with the first EGM, the first multipurpose EGM/player tracking device having a first port and a second port, the first port of the first multipurpose EGM/player tracking device for coupling the first multipurpose EGM/player tracking device to the first EGM with a first communications link, the first multipurpose EGM/player tracking device having an associated IP address and configured to communicate with the first EGM using a first communications protocol;

providing a first middleware server computer being coupled to the first multipurpose EGM/player tracking device with a first system communications link, the first multipurpose EGM/player tracking device configured to communicate to the first middleware server using a system communications protocol;

providing a second multipurpose EGM/player tracking device associated with the second EGM, the second multipurpose EGM/player tracking device having a first port and a second port, the first port of the second multipurpose EGM/player tracking device for coupling the second multipurpose EGM/player tracking device to the second EGM with a second communications link, the second multipurpose EGM/player tracking device having a second associated IP address and configured to communicate with the second EGM using a second communications protocol that is different than the first communications protocol;

providing a second middleware server computer being coupled to the second multipurpose EGM/player tracking device with a second system communications link, the second multipurpose EGM/player tracking device configured to communicate with the second middleware server using the system communications protocol; and, providing a multipurpose EGM/player tracking services database server computer connected to the first and second middleware server computers, the multipurpose EGM/player tracking services database server computer for providing gaming services to users of the first EGM through the first multipurpose EGM/player tracking device and the first middleware server and of the second EGM through the second multipurpose EGM/player tracking device and the second middleware server, respectively;

providing a first table in the multipurpose EGM/player tracking services database server computer for storing the first IP address, indicating the first multipurpose EGM/player tracking device is connected to the first middleware server;

providing a second table in the multipurpose EGM/player tracking services database server computer for storing the second IP address, indicating the second multipurpose EGM/player tracking device is connected to the second middleware server;

allowing the first EGM and the first multipurpose EGM/player tracking device to be disconnected from the first middleware server and to be connected to the second middleware server; and, allowing the first IP address to be deleted from the first table and stored in the second table.

* * * * *

UNITED STATES PATENT AND TRADEMARK OFFICE
CERTIFICATE OF CORRECTION

PATENT NO. : 8,429,229 B2
APPLICATION NO. : 12/235237
DATED : April 23, 2013
INVENTOR(S) : Edward Sepich et al.

It is certified that error appears in the above-identified patent and that said Letters Patent is hereby corrected as shown below:

In the Specifications:

Column 14, line 56: Please delete the number "1" after the word claim and replace with number --2--.

Signed and Sealed this
Sixteenth Day of July, 2013

Teresa Stanek Rea
*Acting Director of the United States Patent and Trademark Office*